(12) United States Patent
Williames

(10) Patent No.: US 11,420,400 B2
(45) Date of Patent: Aug. 23, 2022

(54) APPARATUS FOR MANUFACTURING A CONTAINER

(71) Applicant: Auzfresh Holdings Pty Ltd, Minyama (AU)

(72) Inventor: Darren John Williames, Minyama (AU)

(73) Assignee: Auzfresh Holdings Pty Ltd, Minyama (AU)

( * ) Notice: Subject to any disclaimer, the term of this patent is extended or adjusted under 35 U.S.C. 154(b) by 0 days.

(21) Appl. No.: 16/961,924

(22) PCT Filed: Jan. 15, 2019

(86) PCT No.: PCT/AU2019/050023
§ 371 (c)(1),
(2) Date: Jul. 13, 2020

(87) PCT Pub. No.: WO2019/136530
PCT Pub. Date: Jul. 18, 2019

(65) Prior Publication Data
US 2020/0384702 A1 Dec. 10, 2020

(30) Foreign Application Priority Data
Jan. 15, 2018 (AU) ................................ 2018900115

(51) Int. Cl.
*B29C 65/08* (2006.01)
*B29C 65/78* (2006.01)
(Continued)

(52) U.S. Cl.
CPC ............ *B29C 66/851* (2013.01); *B29C 53/46* (2013.01); *B29C 65/08* (2013.01);
(Continued)

(58) Field of Classification Search
CPC ............. B29C 65/7861; B29C 65/7876; Y10T 156/1013; Y10T 156/1038
See application file for complete search history.

(56) References Cited

U.S. PATENT DOCUMENTS

| 3,764,425 A | 10/1973 | Neff et al. |
| 4,151,024 A | 4/1979 | Ohlsson |

FOREIGN PATENT DOCUMENTS

| EP | 2314518 | 4/2011 |
| GB | 1509932 | 5/1978 |

(Continued)

OTHER PUBLICATIONS

International Search Report for Application No. PCT/AU2019/050023 dated Apr. 5, 2019 (5 pages).
(Continued)

*Primary Examiner* — Barbara J Musser
(74) *Attorney, Agent, or Firm* — Michael Best & Friedrich LLP

(57) ABSTRACT

An apparatus for manufacturing a container that includes a side wall (5) in the form of a tube and a base (7) at one end of the tube. The apparatus includes a tube forming unit (15) for progressively folding a length of a sheet (19) of a side wall material into an elongate tube shape (21) having a forward end (23) for receiving a base (7) of the container and welding together lengthwise extending sides of the sheet to form the tube. The apparatus also includes a base attachment unit (17) for positioning a base of the container on the forward end of the tube.

24 Claims, 10 Drawing Sheets

(51) Int. Cl.
    *B65D 85/34*        (2006.01)
    *B29C 53/46*        (2006.01)
    *B29L 31/00*        (2006.01)
    *B29C 65/00*        (2006.01)

(52) U.S. Cl.
    CPC ...... *B29C 65/7802* (2013.01); *B29C 65/7841* (2013.01); *B29C 66/432* (2013.01); *B29C 66/534* (2013.01); *B29C 66/53461* (2013.01); *B65D 85/34* (2013.01); *B29L 2031/712* (2013.01)

(56) References Cited

FOREIGN PATENT DOCUMENTS

| | | | |
|---|---|---|---|
| GB | 1551113 | A | 8/1979 |
| GB | 2156268 | | 10/1985 |

OTHER PUBLICATIONS

European Patent Office Extended Search Report for Application No. 19738420.9 dated Jan. 24, 2022 (8 pages).

(a) (b) (c)

APPARATUS FOR MANUFACTURING A CONTAINER

TECHNICAL FIELD

The present invention relates to an apparatus for manufacturing a container that is suitable particularly although not exclusively for packaging and transporting perishable produce, such as fruit.

The present invention also relates to a method of manufacturing the container.

The present invention also relates to the container.

BACKGROUND ART

The invention relates particularly to containers of the type that comprise a side wall in the form of a tube, a base at one end of the tube, and a removable lid at the other end of the tube.

The invention relates particularly to containers of the type that comprise a side wall in the form of a tube such as a cylindrical tube made from a plastics material, a base made from a plastics material that is welded or otherwise connected to one end of the tube, and a removable lid that is typically made from a plastics material and is adapted to be inserted into and removed from the other end of the tube to allow access to the contents of the container.

The invention provides an apparatus and a method for manufacturing these containers that is an alternative to currently-available apparatus and methods.

The above description is not to be taken as an admission of the common general knowledge in Australia or elsewhere.

SUMMARY OF THE DISCLOSURE

In general terms, the present invention provides an apparatus for manufacturing a container that includes a side wall in the form of a tube and a base at one end of the tube.

In general terms, the apparatus includes:
  (a) a tube forming unit for progressively folding a length of a sheet of a side wall material into an elongate tube shape having a forward end for receiving a base of the container and welding together lengthwise extending sides of the sheet to form the tube; and
  (b) a base attachment unit for positioning a base of the container on the forward end of the tube.

The apparatus may also include a control system for moving the base and the tube so that that the forward end of the tube is in a required base receiving position to receive the base.

The apparatus may also include an end welding unit for welding the base to the forward end of the tube.

The end welding unit may be any suitable welding unit.

For example, the end welding unit may be an ultrasonic welding unit.

The end welding unit may be a thermal welding unit.

The end welding unit may be adapted to weld the base and the forward end of the tube together at a single location or multiple locations around the perimeter of the forward end of the tube.

The end welding unit may be adapted to weld the base and the forward end of the tube together with a continuous weld around the perimeter of the forward end of the tube.

Alternatively, the base and/or the forward end of the tube may be formed so that the base and the tube mechanically interlock together when the base is positioned on the forward end of the tube. The mechanical interlock may be via friction engagement. For example, the base may be adapted, such as by including a perimeter flange, to be inserted into or inserted over the forward end of the tube.

The base attachment unit may include a base loading head for picking up the base from a base feed position and supporting the base and releasing the base when the base is positioned on the forward end of the tube.

The base loading head may be adapted to contact the base at the feed position and apply at least a partial vacuum to the base that retains the base to the head.

The base attachment unit may also include a feed assembly for supporting a stack of bases and delivering each base in turn to the base feed position.

The feed assembly may be a standard de-nesting unit designed to deliver a single base from a nested stack of bases.

The feed assembly may be positioned so that the stack is a vertical or an inclined stack to facilitate gravity feeding bases downwardly from a higher feed end of the stack to the base feed position of the stack.

The base attachment unit may also include a drive assembly for moving the base loading head and the base from the base feed position to the forward end of the tube and for returning the base loading head (without the base) from the forward end of the tube to the base feed position.

The drive assembly may be adapted to move the base loading head in a linear path away from the feed position to a base loading position. The drive assembly may be adapted to move the base loading head in any other suitable path away from the feed position to the base loading position The drive assembly may be adapted to pivot the base loading head from the base loading position to position the base on the forward end of the tube at the base receiving position.

The drive assembly may include an indexing unit for moving the base loading head in a series of steps in the above-described pathway between the base loading position and the base receiving position.

The base attachment unit may include an assembly for holding the forward end of the tube so that the tube has a required transverse cross-section, such as a circular transverse cross-section in the case of a cylindrical tube, while each base is positioned on the forward end of the tube.

The purpose of the holding assembly is to ensure that the cross-section of the forward end of the tube is the correct cross-section for the base. For example, in the case of a cylindrical tube, the purpose of the holding assembly is to ensure that the forward end of the tube has a circular cross-section, rather than an oblong or other cross-section, so that the cross-section is correct for the base. This is particularly important in situations whether the base is formed, for example with a perimeter flange, to be inserted into the forward end of the tube.

The holding assembly may include two holding units that are movable inwardly toward and outwardly away from the forward end of the tube, each holding unit including a surface that defines one-half of a required outer perimeter of the tube so that, in use, the surfaces are moved to contact the forward end of the tube and ensure that the tube has a required transverse cross-section, such as a circular cross-section in the case of a cylindrical tube, while each base is positioned on the forward end of the tube.

The tube forming unit may include:
  (a) a drive assembly for transporting the side wall sheet material and the tube formed from the material through the tube forming unit to the base receiving position;

(b) an assembly for supporting a coil of side wall sheet material so that the sheet material can be unwound from the coil and fed through the tube forming unit, (c) a series of lengthwise spaced-apart tube folding elements, such as pairs of rollers or other suitable elements, for progressively folding the sheet material into a tube having a required transverse cross-section with side edges of the sheet material in contact along the length of the tube, and (d) a seam welding unit for progressively welding the side edges of the sheet material together and forming an elongate seam of the tube.

The drive assembly may comprise an indexing unit for moving the side wall sheet material and the tube through the tube forming unit in a series of steps to the base receiving position.

The indexing unit may be adapted to for moving the side wall sheet material and the tube a set required length or between index marks.

The seam welding unit may be any suitable welding unit.

For example, the seam welding unit may be an ultrasonic welding unit.

The seam welding unit may be a thermal welding unit.

The tube folding elements may be adapted to form the tube with overlapping side edges.

The tube folding elements may include a pair of lengthwise spaced-apart guide roller units for guiding the tube to the seam welding unit.

Each guide roller unit may include (i) a first set of guide rollers for contacting the outer surface of the tube and locating and guiding the tube, (ii) a first support arm supporting each first guide roller for rotation about an axis in response to contact of the first guide roller with the tube as the tube moves through the guide roller unit, and (iii) an adjustment assembly for moving each first support arm radially inwardly and outwardly between an inner position and an outer position to adjust the size of the opening for the tube. This arrangement makes it possible to use the guide roller unit with a range of different sizes of the cross-sections of the tubes.

Typically, the first guide rollers are arranged at spaced intervals around a perimeter that is transverse to the direction of movement of the tube and define an opening within the perimeter through which the tube moves.

Each guide roller unit may include:

(a) an inner support plate with a central opening for the tube to pass through and a plurality of first elongate channels extending radially outwardly from the central opening, with the first elongate channels receiving and guiding the first support arms and thereby the first guide rollers for radial movement between the retracted and the extended positions; and (b) a pair of outer support plates on opposite sides of the inner support plate, with at least one outer support plate being mounted so that it can rotate relative to the inner support plate.

The adjustment assembly for each first guide roller may include (i) a coupling pin extending outwardly from the first support arm of the first guide roller and (ii) a plurality of spiral grooves in the rotatable outer support plate that receive the coupling pins of the first guide rollers, with each spiral groove extending between an inner end and an outer end that is located outwardly of the inner end, whereby rotation of the outer support plate causes the coupling pins to move along the spiral grooves and thereby outwardly or inwardly and thereby moves the first support arms and the first guide rollers radially between the inner and the outer positions so that the size of the opening defined by the first guide rollers can be selected, and (c) a locking assembly for locking the inner support plate and the outer support plate together to fix the radial position of the first guide rollers and thereby fix the size of the opening.

Each guide roller unit may include a second set of the guide rollers and support arms adjacent the first set of guide rollers and support arms, whereby the first and the second sets of the guide rollers locate and guide the tube.

The double set of guide rollers is advantageous in terms of ensuring there is a stable tube diameter and that the tube is guided accurately.

With this arrangement, the inner support plate may include a plurality of second elongate channels extending radially outwardly from the central opening that receive and guide the second support arms and thereby the second guide rollers for radial movement between the inner and the outer positions.

With this arrangement, the other outer support plate may be mounted so that it can rotate relative to the inner support plate, and the adjustment assembly for each second guide roller may include a coupling pin extending outwardly from each second support arm and a plurality of spiral grooves in the other outer support plate that receive the coupling pins, with each spiral groove extending between an inner end and an outer end that is located outwardly of the inner end, whereby rotation of the outer support plate relative to the inner support plate causes the coupling pins to move along the spiral grooves and thereby outwardly or inwardly and thereby moves the second support arms and the second guide rollers radially between the inner and the outer positions so that the size of the opening defined by the first guide rollers can be selected.

The second guide rollers may be off-set in relation to the first guide rollers around the perimeters of the guide rollers. This feature allows the guide rollers to maximise contact with the tube around the perimeter of the tube. This is an important consideration for larger diameter tubes.

The tube folding elements may include a seam adjustment assembly.

In a situation where the seam has overlapping side edges, the seam adjustment assembly may include a pair of gripper elements, with each gripper element being formed to engage a side edge of the sheet and to push the side edges apart to form the seam with a required overlap and to keep seam in a position that is aligned with the downstream seam welding unit.

The seam adjustment assembly may include a support assembly that supports the gripper elements for movement away from and towards each other to adjust the overlap.

The seam adjustment assembly may include any suitable means for applying a required biasing force to the gripper elements.

By way of example, the seam adjustment assembly may include a fluid-actuated, typically an air-actuated, assembly for acting against the gripper elements and moving the gripper elements towards and away from each other.

Changing the pressure of the fluid to the fluid-actuated assembly makes it possible to adjust the tension applied to the sheet by the gripper elements.

Typically, the fluid-actuated assembly applies the same pressure to both gripper elements and moves the gripper elements uniformly while keeping the seam in a central position.

A benefit of this arrangement is that different width sheets does not affect the operation of the gripper elements, and the gripper elements are able to automatically accommodate different width sheets, with consequential changes in seam width for a given diameter tube, with the seam remaining in a positioned that is aligned with the downstream seam welding unit.

The seam adjustment assembly may include an assembly for moving the gripper elements laterally with respect to the direction of movement of the tube to facilitate aligning the seam with the downstream seam welding unit.

The seam adjustment assembly may be positioned between the pair of guide roller units. With this arrangement, because the guide roller units have a large contact area, it allows more pressure to be applied by the gripper elements. This reduces the accuracy required to position the gripper elements.

The apparatus may further include a cutting unit for cutting the tube a required distance from the forward end of the tube after the base has been positioned on and welded to the forward end of the tube, thereby forming a tube of a required length with an inserted base and forming the new forward end of the tube for receiving another base.

By way of example, the cutting unit may include a shear blade.

The transverse cross-section of the tube may be any suitable cross-section.

By way of example, the transverse cross-section of the tube may be circular whereby the tube is a cylindrical tube.

By way of further example, the transverse cross-section of the tube may be square.

The base may include a base panel for closing the forward end of the tube and a perimeter flange that extends from the base panel.

The perimeter flange may be adapted to be inserted into the forward end of the tube.

The perimeter flange may include a lead-in edge to facilitate insertion of the flange into the forward end of the tube.

The perimeter flange may be adapted to be positioned over the forward end of the tube.

The base may be made from any suitable material.

For example, the base may be made from a plastics material.

The side wall sheet material may be a plastics material.

The side wall sheet material may be a transparent plastics material.

The present invention also provides a method of manufacturing a container that comprises a side wall in the form of a tube and a base at one end of the tube that comprises:

(a) unwinding a side wall sheet material from a coil of the material;

(b) forming the sheet material progressively into a tube having a required transverse cross-section with side edges of the sheet material in contact along the length of the tube in a tube forming unit;

(c) progressively welding the tube along the side edges and forming a seam of the tube in the tube forming unit; and (d) positioning a base of the container on the forward end of the tube while the tube is supported by the tube forming unit at a base receiving position of the tube forming unit; and (e) cutting the tube a required distance from the forward end to form the container having a required length and a new forward end of the tube for receiving a new base.

The method may include welding together the base and the forward end of the tube.

The method may include mechanically interlocking together the base and the forward end of the tube.

The method may include holding the forward end of the tube so that the tube has a required transverse cross-section, such as a circular transverse cross-section in the case of a cylindrical tube, while each base is positioned on the forward end of the tube.

The apparatus and the method may be suitable by way of example for manufacturing a container for packaging and transporting perishable produce, such as fruit. The apparatus and the method are not confined to this application.

The present invention also provides a guide roller unit per se for guiding a lengthwise folded tube of sheet material to a seam welding unit includes (i) a first set of guide rollers for contacting an outer surface of the tube and locating and guiding the tube, (ii) a first support arm supporting each first guide roller for rotation about an axis in response to contact of the first guide roller with the tube as the tube moves through the guide roller unit, and (iii) an adjustment assembly for moving each first support arm radially inwardly and outwardly between an inner position and an outer position to adjust the size of the opening for the tube.

The first guide rollers may be arranged at spaced intervals around a perimeter that is transverse to the direction of movement of the tube and define an opening within the perimeter through which the tube moves.

Each guide roller unit may include:
(a) an inner support plate with a central opening for the tube to pass through and a plurality of first elongate channels extending radially outwardly from the central opening, with the first elongate channels receiving and guiding the first support arms and thereby the first guide rollers for radial movement between the retracted and the extended positions; and
(b) a pair of outer support plates on opposite sides of the inner support plate, with at least one outer support plate being mounted so that it can rotate relative to the inner support plate.

BRIEF DESCRIPTION OF THE DRAWING

The present invention is described further with reference to the accompanying Figures, of which:

FIGS. 16-24 show how the base attachment unit of the apparatus picks up and moves a base from a stack and positions the base on an end of a cylindrical tube and welds the base to the tube, with:

FIGS. 16 and 17 being respective perspective and side views that show a loading head of the base attachment unit picking up the base from the stack of bases;

FIGS. 18 and 19 are respective perspective and side views that show the loading head with retained base a part of the way along a linear path to a loading position for the base;

FIGS. 20 and 21 are respective perspective and side views that show the loading head with the retained base at the loading position;

FIGS. 22 and 23 are respective perspective and side views that show the base on the end of the cylindrical tube and the base being welded to the end of the tube after the loading head has been pivoted from the loading position shown in FIGS. 20 and 21 to the position shown in FIGS. 20 and 21; and FIG. 24 is a side view of the loading head pivoted back to the loading position with the base and the cylindrical tube ready to be transported from the apparatus.

DESCRIPTION OF EMBODIMENT

Figure 1:
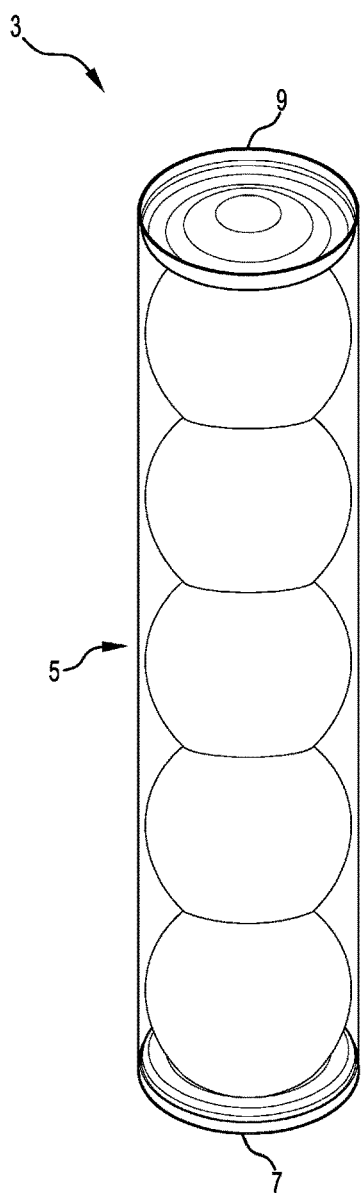
FIG. 1 is a perspective view on one embodiment of a container in accordance with the invention.
Figure 2:
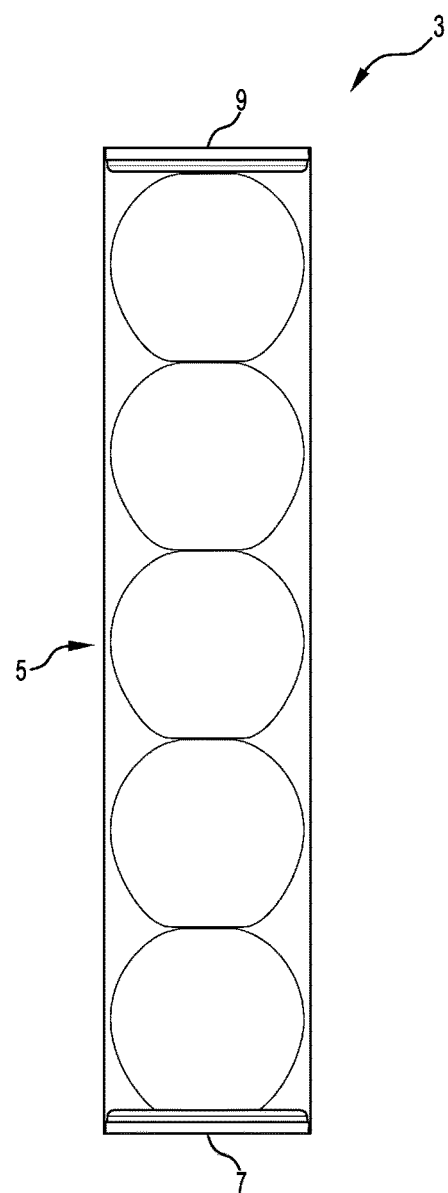
FIG. 2 is a side view of the container shown in FIG. 1.

The embodiment of the container 3 of the invention shown in FIGS. 1 and 2 is suited by way of example for packaging and transporting perishable produce, such as fruit.

With reference to FIGS. 1 and 2, the container 3 has three main components, namely a side wall in the form of a cylindrical tube 5 made from a plastics material, a base 7 made from a plastics material welded to and closing one end of the tube 5, and a lid 9 made from a plastics material that closes the other end of the tube 5 and can be removed to allow access to the contents of the tube 5 and re-inserted to re-close the container 3.

The components are formed separately and are assembled together.

Figure 3:
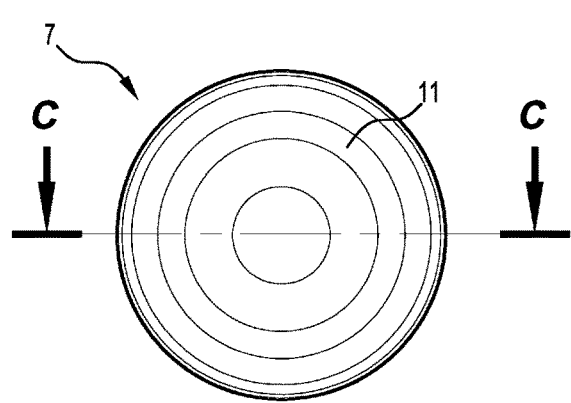
FIG. 3 is a top view of the base of the container shown in FIG. 1.
Figure 4:
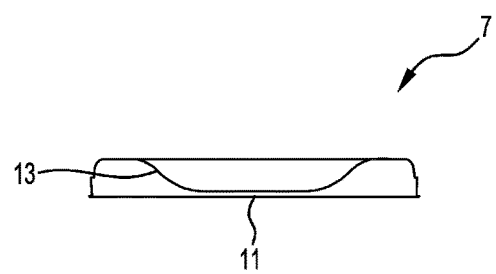
FIG. 4 is a cross-section of the base component along the line C-C of FIG. 3.

The base 7 is shown in detail in FIGS. 3 and 4. The base 7 includes a circular base panel 11 for closing the base end of the tube 5 and a continuous perimeter flange 13 that extends from the base panel 11 and extends into the base end of the tube 5 and is welded to the tube 5.

The invention is concerned particularly with assembling the tube 5 and the base 7 together.

Figure 5:
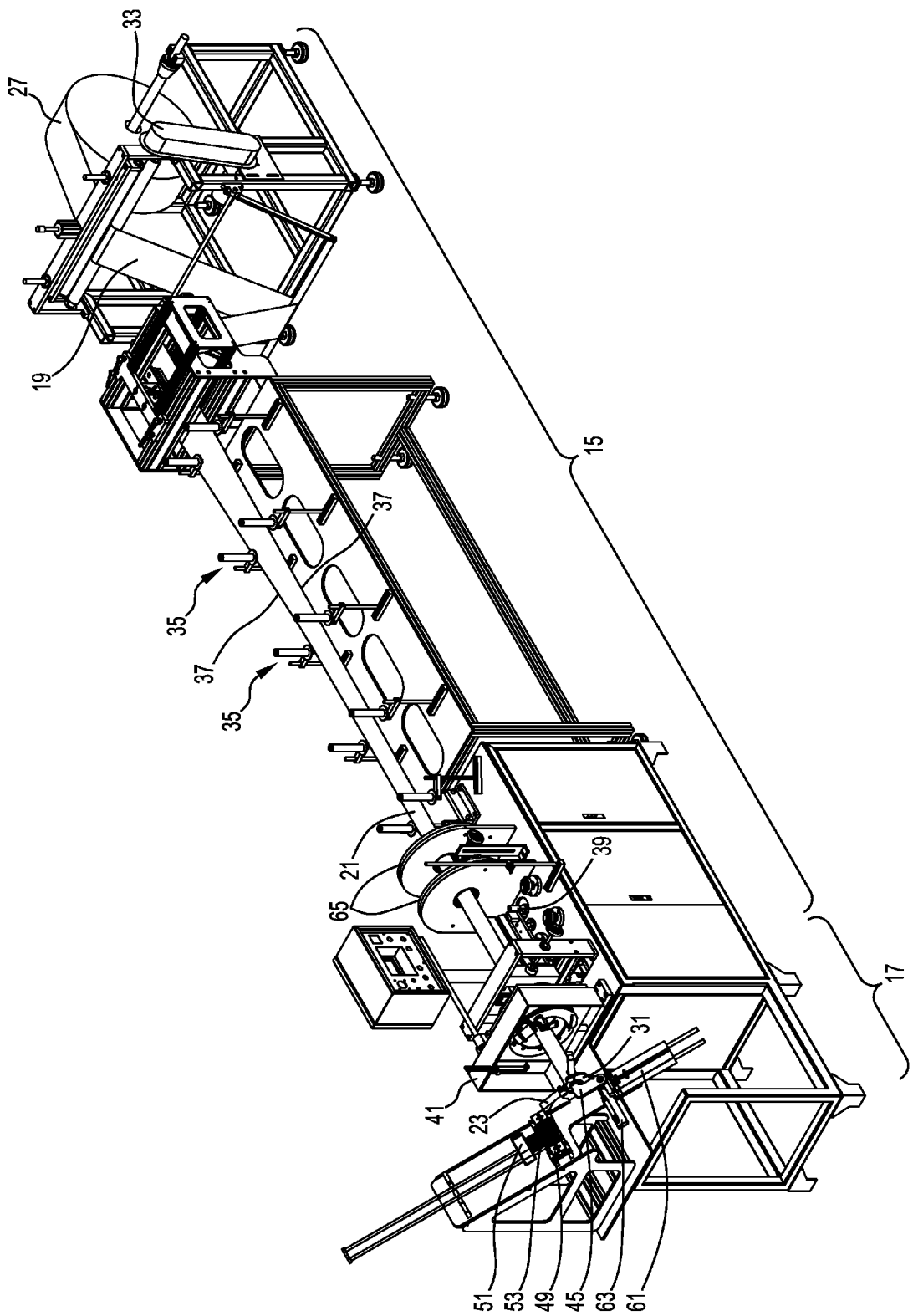
FIG. 5 is a perspective view of one embodiment of an apparatus for manufacturing the cylindrical tube of the container shown in FIGS. 1 and 2 and positioning the container base shown in FIGS. 3 and 4 on an end of the tube.
Figure 6:
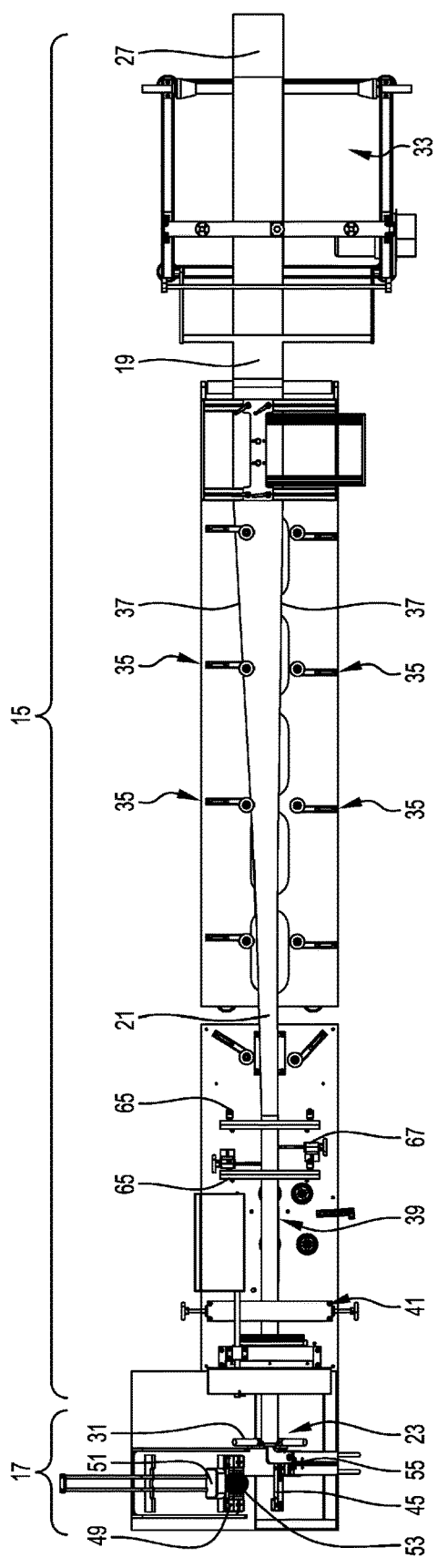
FIG. 6 is a top view of the apparatus shown in FIG. 5.
Figure 7:
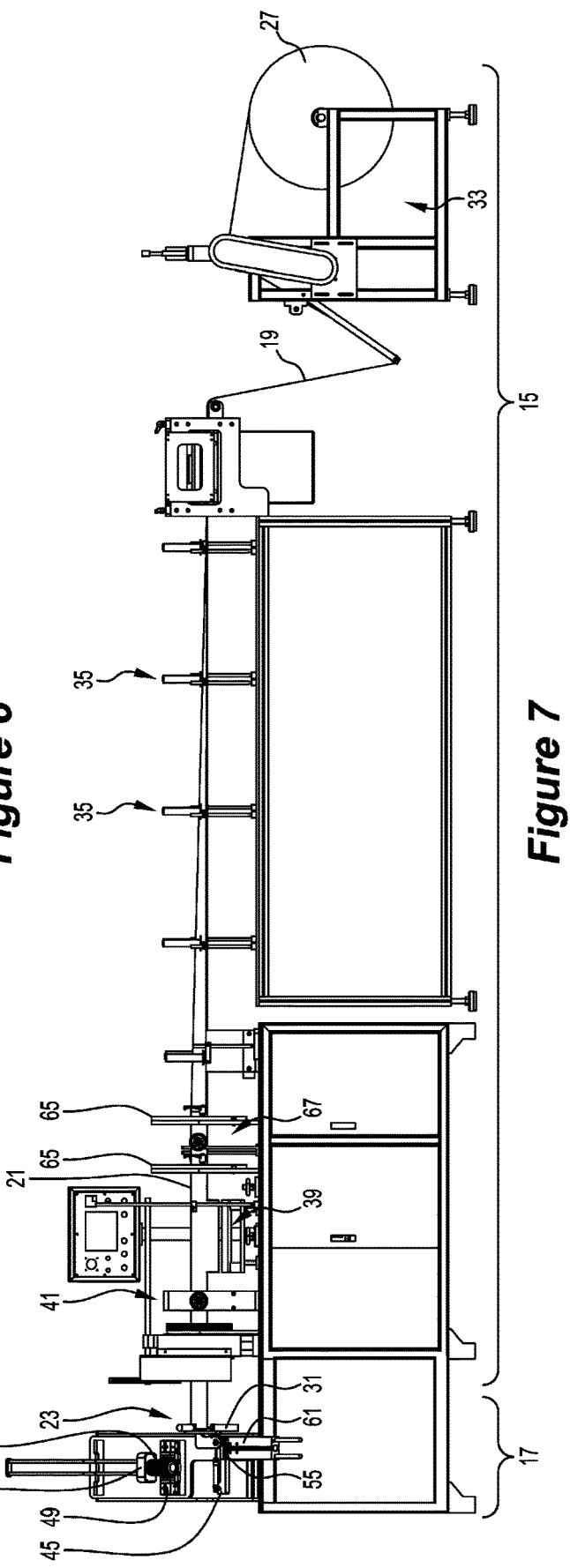
FIG. 7 is a side view of the apparatus shown in FIG. 5.
Figure 8:
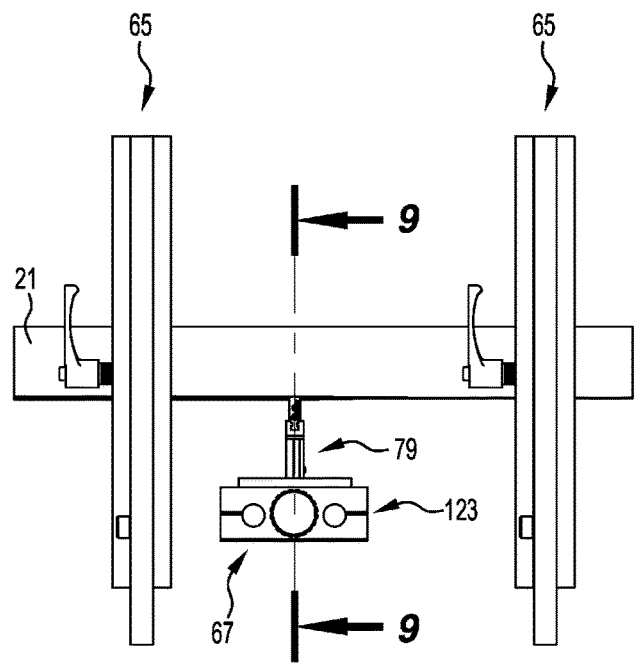
FIG. 8 is a side view of section of the apparatus shown in FIG. 5 that includes a pair of guide roller units and a seam adjustment assembly positioned between the guide roller units.
Figure 9:
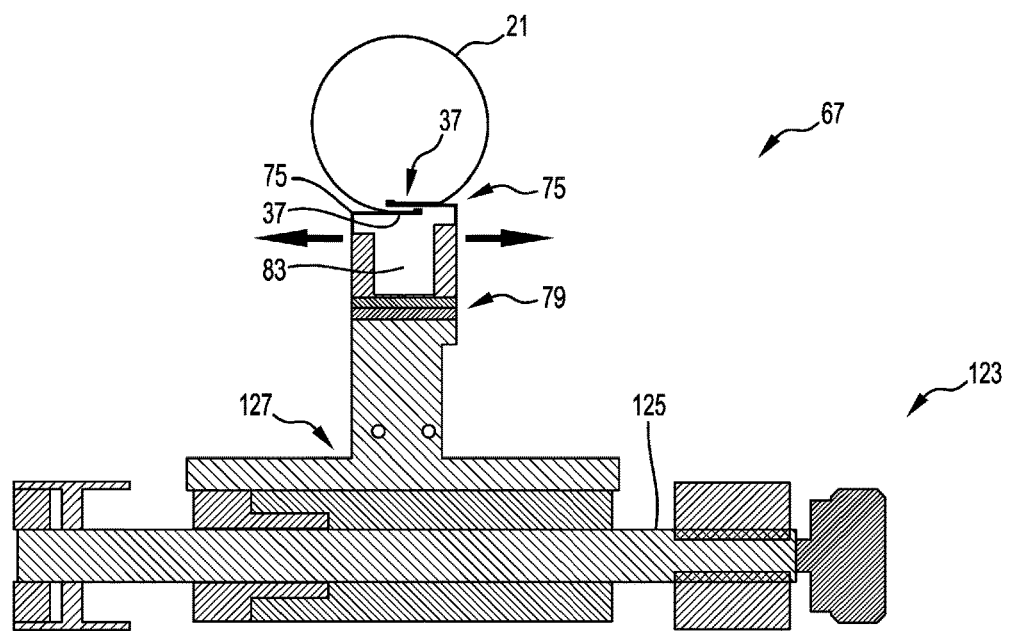
FIG. 9 is a section along the line 9-9 of FIG. 8.
Figure 10:
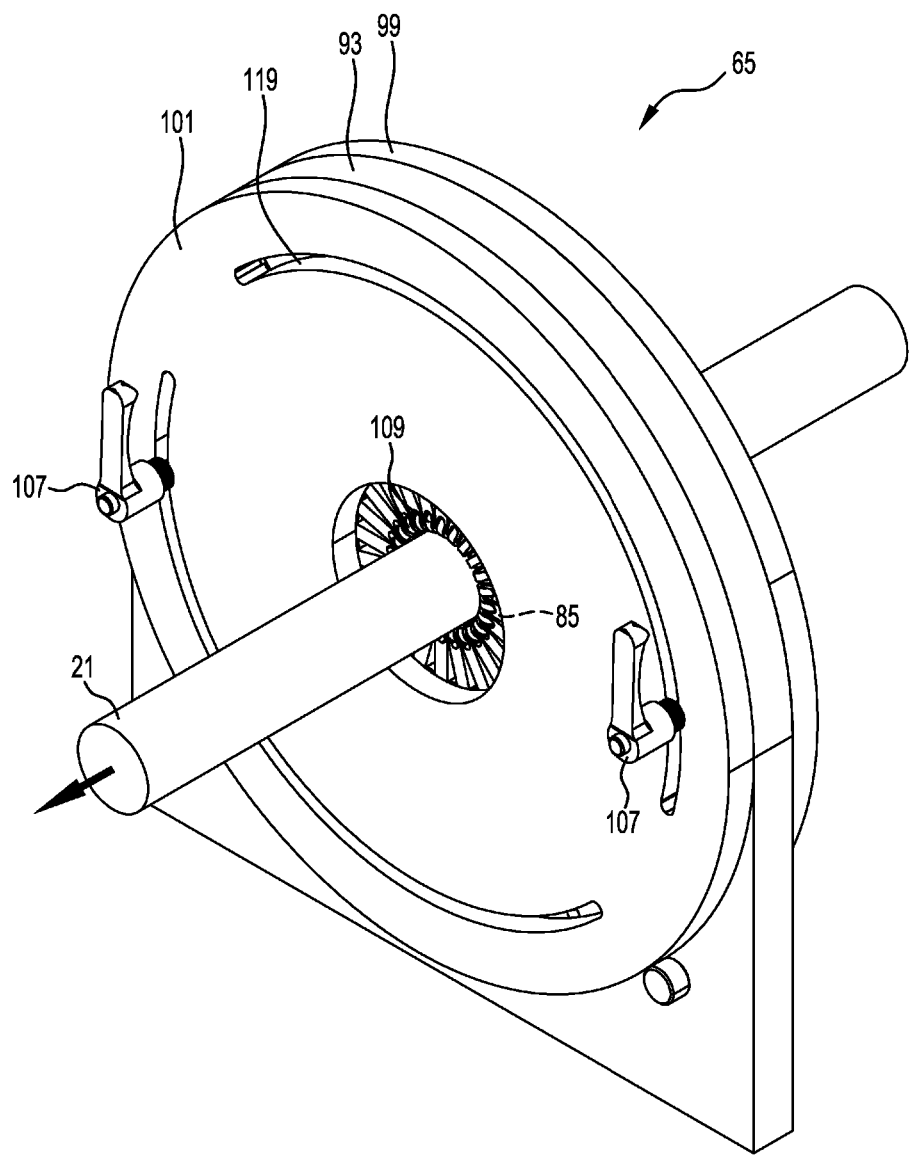
FIG. 10 is a perspective view of one of the guide roller units of the apparatus shown in FIG. 5.
Figure 11:
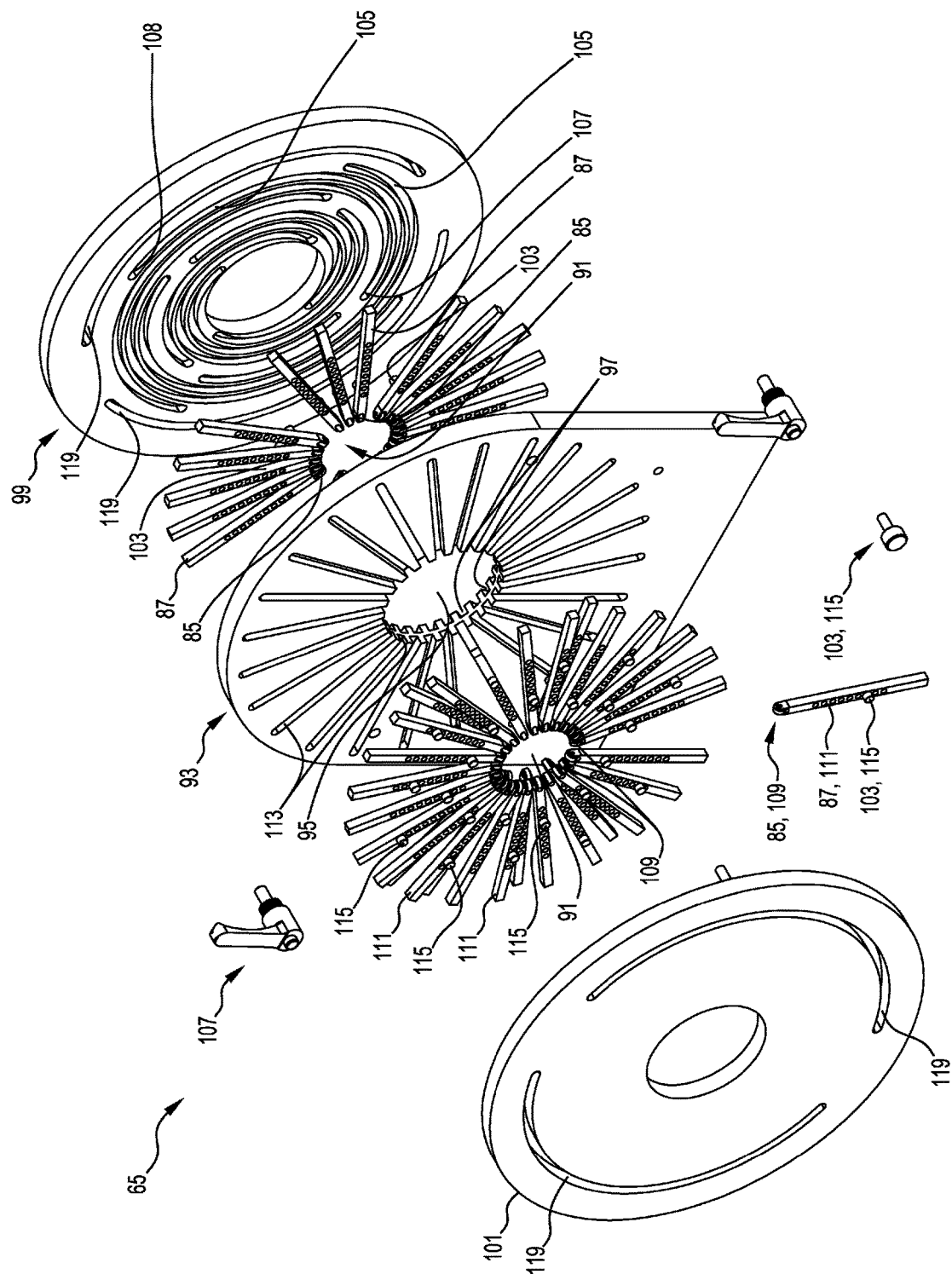
FIG. 11 is an exploded perspective view of the guide roller unit shown in FIG. 10.
Figure 12:
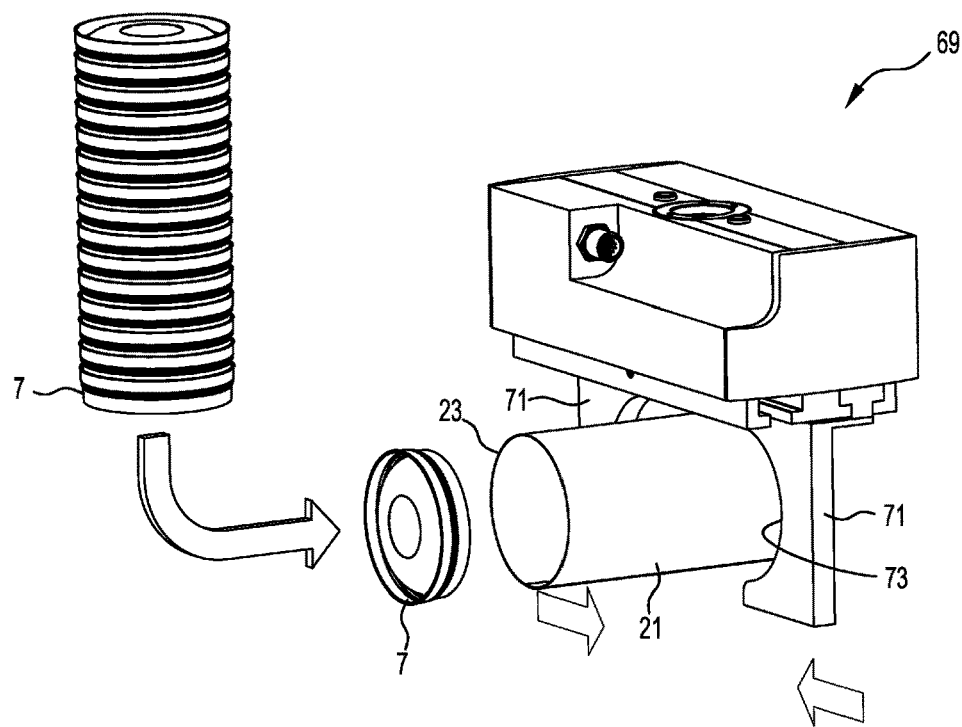
FIG. 12 is a perspective view in diagrammatic form of the section of the apparatus shown in FIG. 5 at the forward end of the apparatus which shows the tube holding assembly of the base attachment unit of the apparatus.
Figure 13:
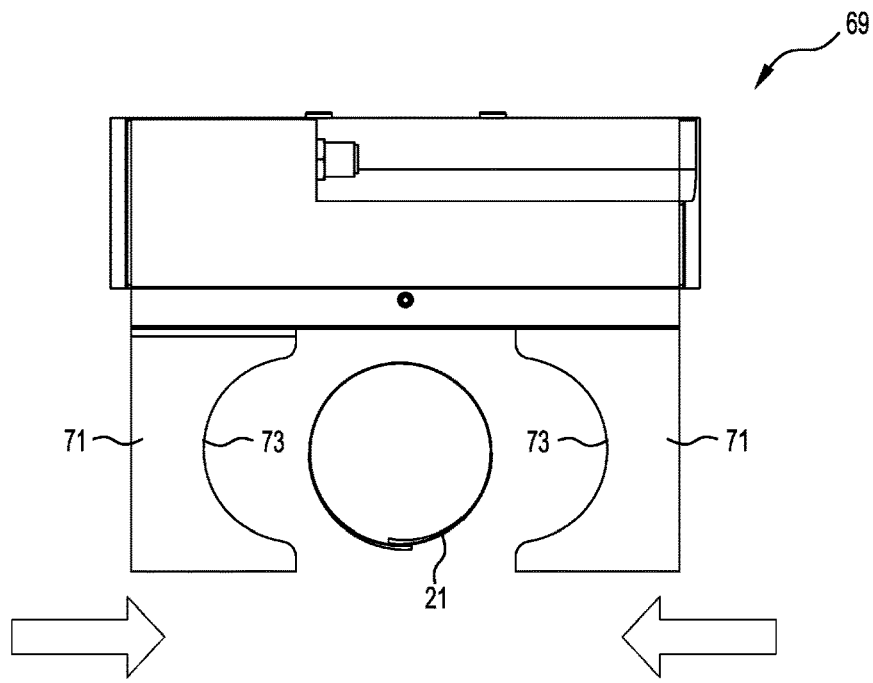
FIG. 13 is an end view of FIG. 12 with the holding assembly in an open position.
Figure 14:
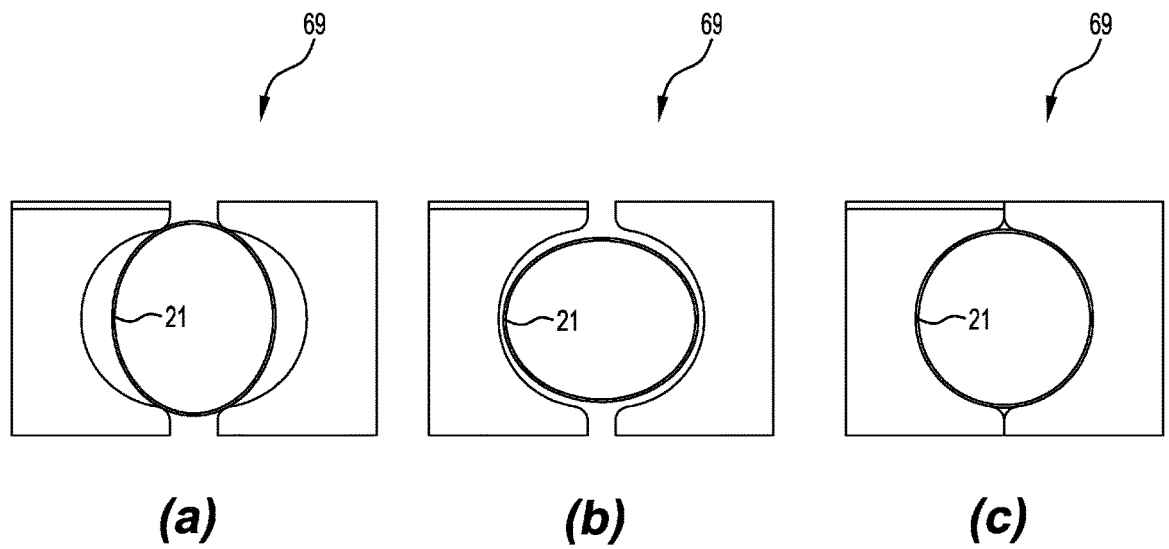
FIG. 14 is a series of end views of FIG. 12 that illustrates how the holding assembly corrects different out-of-shape tube cross-sections.
Figure 15:
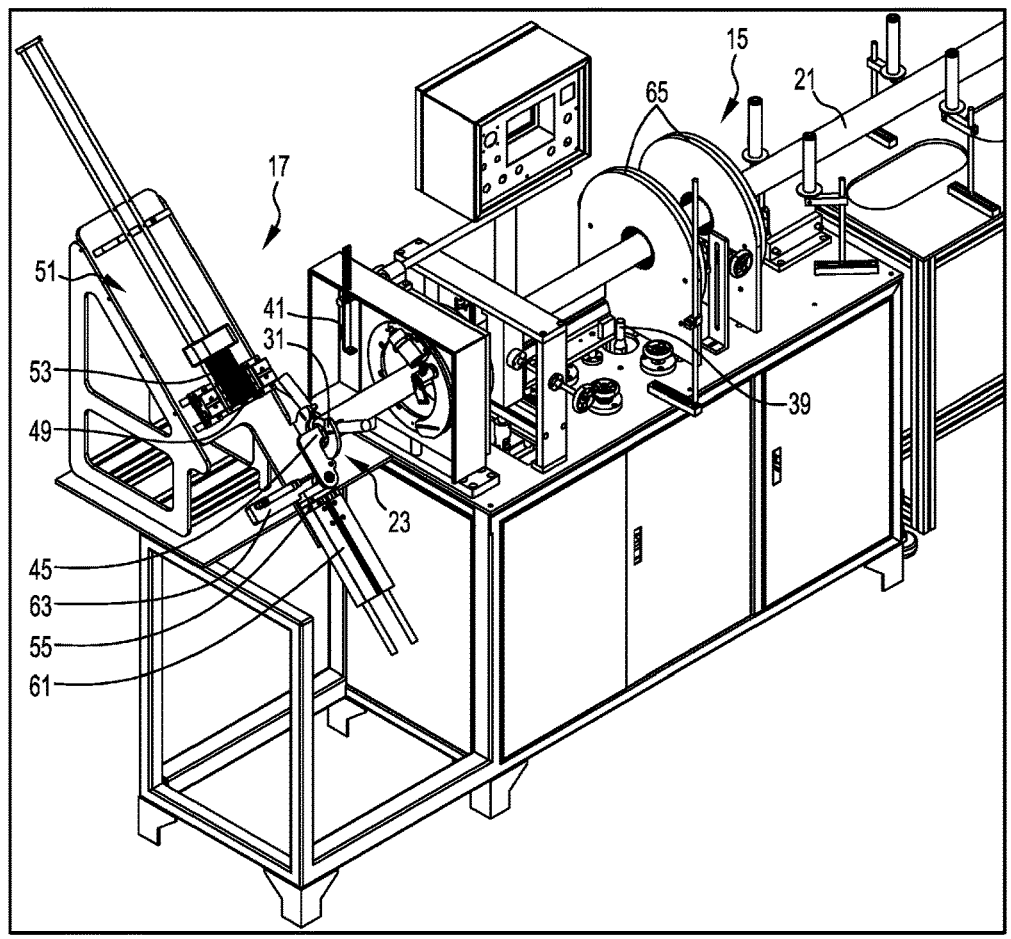
FIG. 15 is an enlarged perspective view of the end of the apparatus shown in FIG. 4 which illustrates the base attachment unit of the apparatus in an operative position in which the unit has positioned a base on the end of a cylindrical tube.

An embodiment of the apparatus for assembling the tube 5 and the base 7 together is shown in FIGS. 5-7. FIGS. 8 and 9 show a seam adjustment unit of the apparatus. FIGS. 10 and 11 show guide roller units of the apparatus. FIGS. 12-14 show a tube holding assembly of the base attachment unit. FIGS. 15-24 show how a base attachment unit of the apparatus picks up and moves a base 7 from a stack of bases and positions the base on an end of a cylindrical tube formed in the apparatus and welds the base 7 to the tube. The seam adjustment unit, the guide roller units, and the tube holding assembly are important features of the embodiment.

The embodiment of the apparatus shown in FIGS. 5-7 comprises:
(a) a tube forming unit generally identified by the numeral 15 for progressively folding a length of a sheet 19 of a side wall material that is unwound from a coil 27 into an elongate tube 21 having a forward end 23 for receiving the base 7 of the container when the forward end is at a base receiving position (as shown in FIGS. 5-7) and welding together lengthwise extending sides of the sheet to form the tube 21 with a lengthwise extending seam; and
(b) a base attachment unit generally identified by the numeral 17 for positioning a base 7 of the container on the forward end 23 of the tube 21 when at the base receiving position; and
(c) an end welding unit 31 for ultra-sonic welding the base 7 to the forward end 23 of the tube 21 at three locations around the perimeter of the tube 21 at the base receiving position.

The apparatus also comprises a control system for moving the base 7 and the tube 21 so that that the forward end 23 of the tube is at the required base receiving position when the base 7 has reached this position and can receive the base 7.

The tube forming unit 15 comprises:
(a) a drive assembly (not shown) for transporting the sheet 19 and the tube 21 formed from the material through the tube forming unit 15 to the base receiving position;
(b) a coil support and unwind assembly 33 that supports the coil 27 of the sheet 19 so that the sheet 19 can be unwound from the coil 27 and fed through the tube forming unit 15,
(c) a series of lengthwise spaced-apart elements in the form of pairs of rollers 35 that are mounted for rotation about vertical axes and are positioned with one roller of each pair on opposite sides of the sheet 19 that progressively fold the sheet 19 into the tube 21, with the tube 21 having a required cylindrical transverse cross-section with side edges 37 of the sheet in contact along the length of the tube 21 with an overlap of the longitudinal side edges of the sheet, and
(d) a pair of guide roller units 65 for locating and guiding the folded tube 21 for downstream forming operations, described below;
(e) a seam adjustment assembly 67 positioned between the guide roller units 65 for controlling the overlap of the side edges 37 of the sheet 19 in the tube 21 and the position of the overlap in relation to the downstream ultra-sonic seam welding unit 39—see below; and
(f) the ultra-sonic seam welding unit 39 mentioned in the preceding paragraph that progressively welds the side edges 37 of the sheet 19 in the tube 21 together at the overlap and forms the elongate seam (not shown) of the tube 21; and
(g) a cutting unit 41 that cuts the tube 21 a required distance from the forward end 23 of the tube 21 after the base 7 has been positioned on and welded to the forward end 23 of the tube 5 at the base receiving position, thereby forming a container tube of a required length (with the length being the distance between the forward end 23 of the tube 21 and the cutter of the cutting unit 41) with an inserted base 7 and forming the new forward end 23 of the tube 21 for receiving another base 7 after the new forward end has been moved forwardly to the base receiving position.

The drive assembly may be any suitable assembly that comprises an indexing unit (not shown) that moves the sheet 19 and the tube 21 in a series of steps of a required length through the tube forming unit 15.

With reference to FIGS. 8 and 9, and with particular reference to FIG. 9, the seam adjustment assembly 67 includes a pair of gripper elements 75 that, in use, engage the side edges 37 of the sheet.

Each gripper element 75 is formed to engage a side edge 37 of the sheet 19 in the folded tube 21 and to push the side edges 37 outwardly to form the seam with a required overlap and to form and hold the seam in a position that is aligned with the downstream seam welding unit 39.

The gripper elements 75, as shown in cross-section in FIG. 9, are L-shaped elements with hooked-ends that, in use, engage the side edge 37 of the sheet and push the sheet 19 outwardly.

The seam adjustment assembly 67 also includes a support assembly generally identified by the numeral 79 that supports the gripper elements 75 for movement away from and towards each other to adjust the overlap. The away movement is illustrated by the arrows in FIG. 19.

The seam adjustment assembly also includes a fluid-actuated, typically an air-actuated, assembly for acting against the gripper elements 75 and moving the gripper elements 75 towards and away from each other in the directions of the arrows in FIG. 9.

It is noted that the seam adjustment assembly may include springs or any other suitable options to applying a required biasing force to the gripper elements 75.

In use, the fluid-actuated assembly supplies fluid, such as air, under a predetermined pressure to the chamber 83, and the fluid pressure holds the gripper elements 75 apart and maintains the position of the overlapping seam. This is important in terms of the downstream seam-welding operation.

Changing the pressure of the fluid to the fluid-actuated assembly makes it possible to adjust the tension applied to the sheet by the gripper elements 75. This is important to be able to accommodate different-width sheets to form a given diameter tube 21. A benefit of this arrangement is that different-width sheets does not affect the operation of the gripper elements 75, and the gripper elements 75 are able to automatically accommodate different width sheets, with consequential changes in seam width for a given diameter tube, with the seam remaining in a position that is aligned with the downstream seam welding unit.

The seam adjustment assembly also includes an assembly generally identified by the numeral 123 for moving the support assembly 79 and the gripper elements 75 laterally with respect to the direction of movement of the tube 21. The assembly 123 includes a shaft 125 that is supported for sliding movement laterally, i.e. towards the left or the right in FIG. 9 and can be locked in place in a required position. The assembly 123 also includes a body 127 that is mounted to the shaft 125 and moves with the shaft 125. The support assembly 79 and the gripper elements 75 are mounted on and move with the body 127. It can be appreciated that, in use, sliding lateral movement of the shaft 125 adjusts the lateral position of the seam to make it possible that the seam is aligned with the downstream seam welding unit 39.

The seam adjustment assembly 67 is positioned between the pair of guide roller units 65. With this arrangement, because the guide roller units 65 have a large contact area, it is possible to apply more pressure to the gripper elements 75.

With reference to FIGS. 10 and 11, each guide roller unit 65 includes:

(a) a first set of guide rollers 85 (i.e. first guide rollers) for contacting the outer surface of the tube 21 and locating and guiding the tube 21 as it passes through an opening 91 defined by the first guide rollers 85, (b) a first support arm 87 (see FIG. 11) supporting each first guide roller 85 for free rotation about an axis (not shown) in response to contact of the first guide roller 85 with the tube 21 as the tube 21 moves through the guide roller unit 65, and (c) an adjustment assembly for moving each first support arm 87 radially inwardly and outwardly between an inner position and an outer position to adjust the size of the opening for the tube—this arrangement making it possible to use the guide roller unit 65 with a range of different sizes of the cross-sections of the tubes 21.

The first guide rollers 85 are arranged at spaced intervals around a perimeter that is transverse to the direction of movement of the tube 21 (this direction is indicated by the arrow in FIG. 10) and define the above-mentioned opening 91 within the perimeter through which the tube 21 moves in use of the apparatus.

Each guide roller unit 65 includes:

(a) an inner support plate 93 with a central opening 95 for the tube 21 to pass through and a plurality of first elongate straight channels 97 extending radially outwardly from the central opening 95, with the first elongate channels 97 receiving and guiding the first support arms 87 and thereby the first guide rollers 85 for radial movement between the retracted and the extended positions; and (b) a pair of outer support plates 99, 101 on opposite sides of the inner support plate, 93.

The outer support plates 99, 101 are each mounted so that they can rotate relative to the inner support plate 93. The outer support plates 99, 101 can also be locked in a fixed position in relation to the inner support plate 93, as described further below The adjustment assembly for each first guide roller 85 includes (i) a coupling pin 103 extending outwardly from the first support arm 87 of the first guide roller 85 and (ii) a plurality of spiral grooves 105 in the outer support plate 99 that receive the coupling pins 103, with each spiral groove 105 extending between an inner end 107 and an outer end 108 that is located outwardly of the inner end 107. With this arrangement, rotation of the outer support plate 99 relative to the inner support plate 93 causes the coupling pins 103 to move along the spiral grooves 105 and thereby outwardly or inwardly (depending on the direction of rotation) and thereby moves the first support arms 87 and the first guide rollers 85 radially between the inner and the outer positions. This movement allows the size of the opening 91 defined by the first guide rollers 85 to be selected. The adjustment assembly for each first guide roller 85 also includes a locking assembly (described further below) for locking the inner support plate 93 and the outer support plate 99 together, thereby to fix the radial position of the first guide rollers 85 and thereby fix the size of the opening 91.

Each guide roller unit 65 also includes a second set of the guide rollers 109 (second guide rollers 109) and support arms 111. The second guide rollers 109 are adjacent to and radially off-set from the first guide rollers 85 and support arms 87. The radial off-set of the first and second guide rollers 85, 109 can best be seen in FIG. 10.

The first and the second guide rollers 85, 109 cooperate together to locate and guide the tube 21.

The double set of guide rollers 85, 109 is advantageous in terms of ensuring there is a stable tube diameter and that the tube is guided accurately.

With this arrangement, the inner support plate 93 includes a plurality of second elongate straight channels 113 extending radially outwardly from the central opening 95 that receive and guide the second support arms 111 and thereby the second guide rollers 109 for radial movement between the inner and the outer positions.

As mentioned above, the outer support plate 101 is mounted so that it can rotate relative to the inner support plate 93. In addition, the adjustment assembly for each second guide roller 109 includes a coupling pin 115 extending outwardly from each second support arm 111 and a plurality of spiral grooves (not visible in FIG. 11—but the same as the grooves 105) in the outer support plate 101 that receive the coupling pins 115, with each spiral groove extending between an inner end and an outer end that is located outwardly of the inner end, whereby rotation of the outer support plate 101 relative to the inner support plate 93 causes the coupling pins 115 to move along the spiral grooves and thereby outwardly or inwardly and thereby moves the second support arms 111 and the second guide rollers 109 radially between the inner and the outer positions so that the size of the opening 91 defined by the second guide rollers 109 can be selected.

The two sets of rollers 85, 109 increases the contact along the length of the tube 21. In addition, the radial off-set of the first guide rollers 85 and the second guide rollers 109 allows the guide rollers 85, 109 to maximise contact with around the perimeter of the tube 21. In this regard, the physical size of the rollers limits the number of rollers that can be fitted around the perimeter. Maximising perimeter contact is an important consideration for larger diameter tubes.

With further reference to FIGS. 10 and 11, the locking assembly comprises a pair of lockable handles 107 that cooperate with part-circular-shaped slots 119 in the inner plate 99 and another pair of lockable handles 107 that cooperate with part-circular-shaped slots 119 in the outer plate 101. When engaged, the locking handles 107 hold the outer plates 99, 101 in position in relation to the inner plate 93. Therefore, in use, with the locking handles disengaged, the outer plates 99, 101 are rotated relative to the inner plate 91 to select the required diameter for the openings 91. At this point, the locking handles 107 are engaged to fix the outer plates 99, 101 to the inner plate 93 and thereby fix the diameter of the openings 91.

With reference to FIGS. 12-14, the base attachment unit 17 includes an assembly generally identified by the numeral 69 for holding the forward end 23 of the tube 21 so that the tube 21 has a required circular transverse cross-section while each base 7 is positioned on the forward end 23 of the tube 21.

The holding assembly 69 is positioned at the downstream end of the apparatus and is not shown specifically in FIGS. 5-7 and 15 because it is obscured by other units at that end of the apparatus.

The purpose of the holding assembly 69 is to ensure that the cross-section of the forward end 23 of the tube 21 is the correct cross-section for the base 7.

The holding assembly 69 includes two holding units in the form of clamps 71 that are movable inwardly toward and outwardly away from the tube 21. Each holding unit 71 has a semi-circular surface 73 that defines one-half of a required outer surface of the tube 21 so that, in use, the surfaces 73 are moved to contact the outer surface of the tube 21 at the forward end 23 of the tube 21 and form around the tube 21 and bias the tube 21 into a required circular cross-section.

This action of the holding units 71 is illustrated in FIG. 14 which shows diagrammatically how the inwardly-moving holding units 71 bias the out-of-round shapes in FIGS. 14(a) and 14(b) into the required circular cross-section shape shown in FIG. 14(c). The movement of the holding units 71 is illustrated by the inwardly directed arrows shown in FIG. 13.

Basically, the holding assembly 69 supports the holding units 71 for sliding movement inwardly/outwardly toward/away from each other.

In use, the apparatus is controlled to move the holding units 71 inwardly to the closed position shown in FIG. 14(c) at the time immediately prior to the insertion of a base 7 into the forward end 23 of the tube 21 and remains closed during this operation, as described below.

The base attachment unit 17 also comprises a base loading head 45 that picks up the base 7 from a base feed position 49 and supports the base 7 as the base loading head 45 is moved to the forward end 23 of the tube 21 and releases the base 7 when the base 7 is positioned on the forward end 23 of the tube 21 at the base receiving position. The base loading head 45 applies a partial vacuum to the base 7 that retains the base to the head 45.

The base attachment unit 17 also comprises a feed assembly generally identified by the numeral 51 for supporting a stack 53 of bases 7 and delivering each base 7 in turn to the base feed position 49. The feed assembly 51 is typically a standard de-nesting unit designed to deliver a single base 7 from a nested stack 53 of bases 7. The feed assembly 51 is positioned so that the stack 53 is an inclined orientation to facilitate gravity feeding the nested bases 7 downwardly from an upper feed end of the stack to the base feed position 49 of the stack.

The base attachment unit 17 also comprises a drive assembly for moving the base loading head 45 and a base 7 retained on the head 45 from the base feed position 49 to the forward end 23 of the tube 21.

The drive assembly moves the base loading head 45 and the retained base 7 firstly in a linear path downwardly away from the feed position 49 to a base loading position 55. The drive assembly then pivots the base loading head 45 from the base loading position 55 to insert the perimeter flange 13 of the base 7 into the forward end 23 of the tube 21 at the base receiving position of the tube 21.

The drive assembly comprises an indexing unit (not shown) that moves the base loading head 45 in a series of steps through a base attachment sequence that moves the base loading head 45 and the retained base 7 along the above-described pathway.

The drive assembly comprises a first piston/cylinder assembly 61 that moves the base loading head 45 and the retained base 7 in the linear path. The base loading head 45 includes a L-shaped arm that is mounted for pivotal movement to a support element. The support element is connected directly to the first piston/cylinder assembly, and the first piston/cylinder assembly moves the base loading head 45 in the linear path by this connection.

The drive assembly also comprises a second piston/cylinder assembly 63 that is connected to the arm of the base loading head 45 and moves the arm so that it pivots about the support element from the base loading position 55 to the forward end 23 of the tube 21 and inserts the retained base 7 into the forward end 23 of the tube 21 at the base receiving position. At this point, the base loading head 45 releases the base 7.

The drive assembly then moves the base loading head 45 back along the pathway to the base feed position 49 of the feed unit and then repeats the above-described base attachment sequence.

When the base 7 is inserted into position in the forward end 21 of the tube 5, the three welding heads of the end welding unit 31 ultra-sonically weld the base 7 to the forward end 23 of the tube 21 at three locations around the perimeter of the tube 21.

A required length of tube 21 with inserted and welded base 7 is then cut from the tube 21 by the cutting unit 41 and forms (a) a container tube with welded base and (b) a new forward end 23 of the tube 21.

The completed container tube with welded base is then removed using a standard pick and place unit (not shown).

The series of steps in the above-described base attachment sequence are illustrated in FIGS. 16-24.

Figure 16:
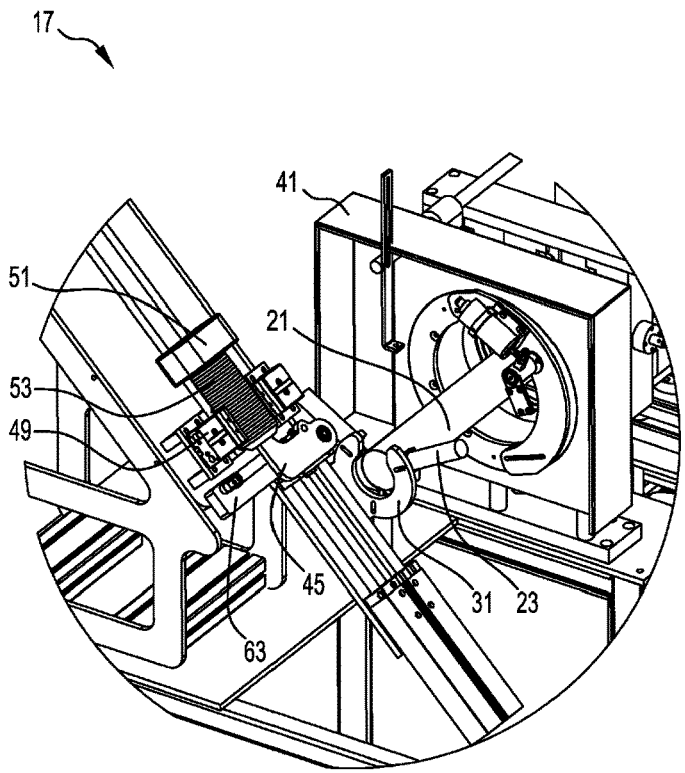
Figure 17:
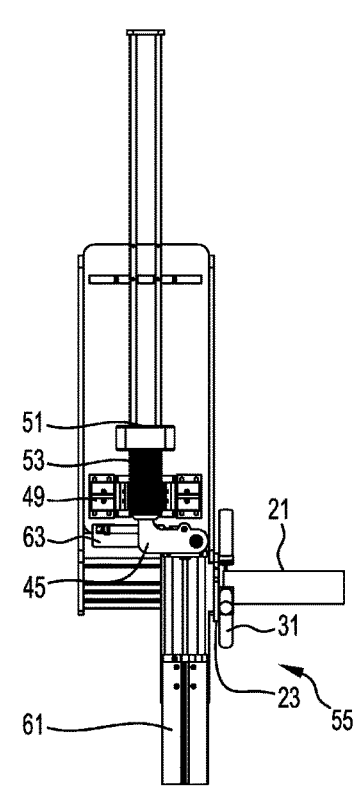

FIGS. 16 and 17 are respective perspective and side views that show the loading head 45 picking up the base 7 from the stack 53 of bases 7.

Figure 18:
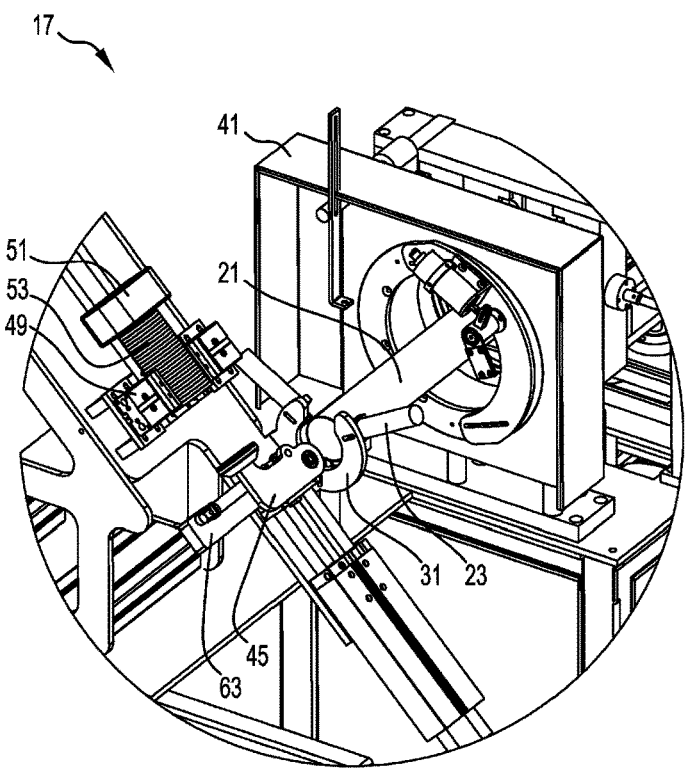
Figure 19:
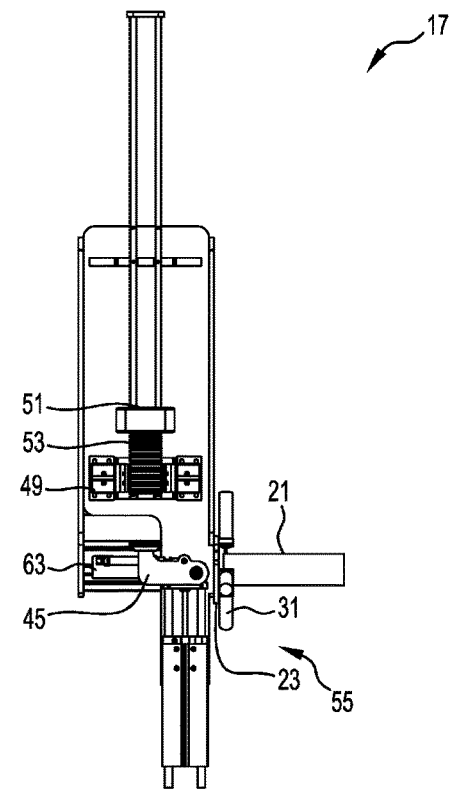

FIGS. 18 and 19 are respective perspective and side views that show the base loading head 45 with the retained base 7 a part of the way along the linear path to the base loading position 55 for the base; 7.

Figure 20:
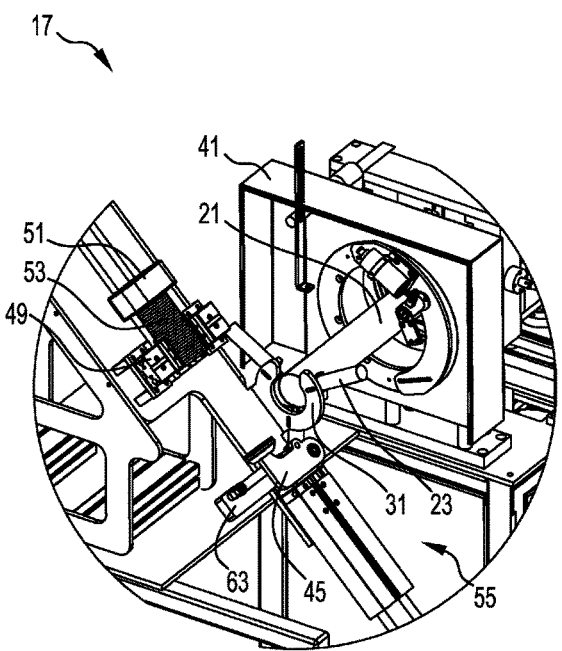
Figure 21:
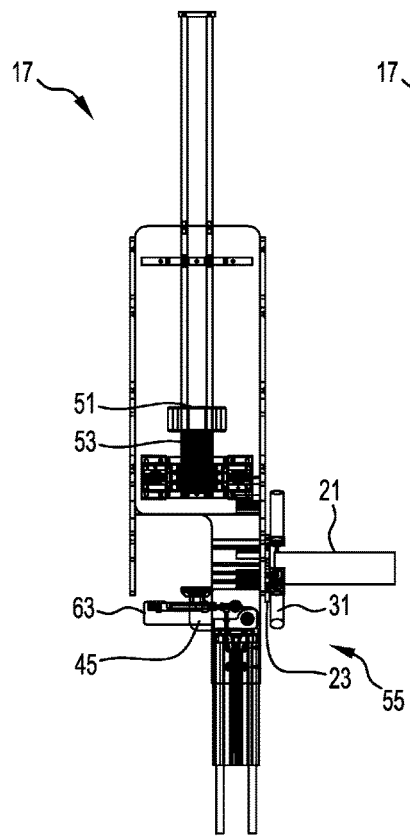

FIGS. 20 and 21 are respective perspective and side views that show the base loading head 45 with the retained base 7 at the base loading position 55.

Figure 22:
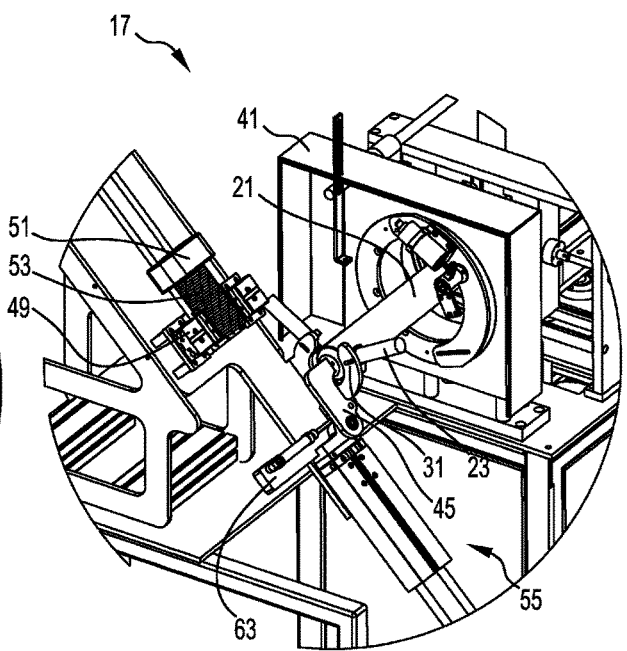
Figure 23:
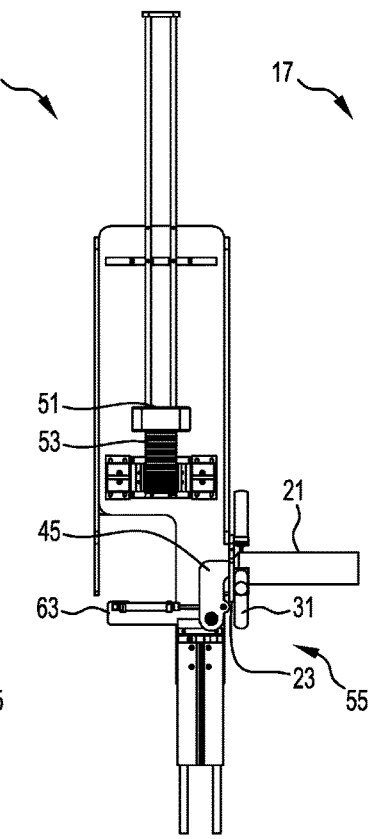

FIGS. 22 and 23 are respective perspective and side views that show the base 7 on the forward end 23 of the tube 21 and the base 7 being welded to the forward end 23 of the tube 21 after the base loading head 45 has been pivoted from the base loading position 55 shown in FIGS. 20 and 21 to the position shown in FIGS. 20 and 21.

Figure 24:
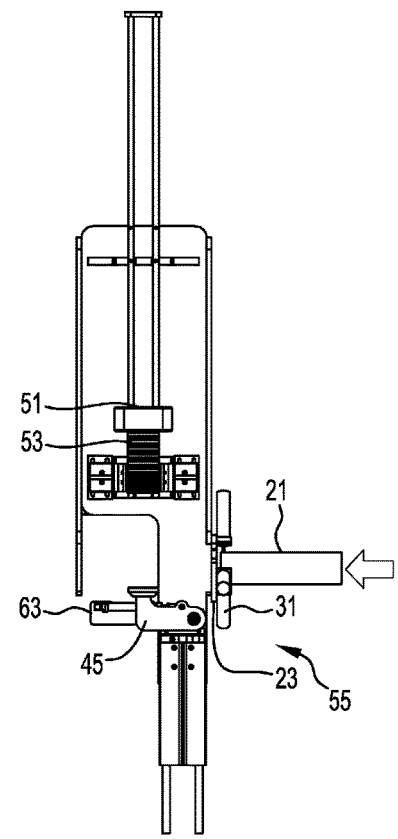

FIG. 24 is a side view of the base loading head 45 pivoted back to the base loading position 55 with the container comprising the length of tube 21 and the welded base 7 ready to be transported from the apparatus. In this position, the base loading head 45 is part of the way along a return path to pick up a new base 7.

Many modifications may be made to the embodiment of the present invention described above without departing from the spirit and scope of the invention.

By way of example, whilst the container 3 shown in Figures includes a cylindrical tube 5, the invention is not so limited and extends to tubes 5 having any suitable transverse cross-section. By way of example, the invention extends to tubes 5 that have square or rectangular cross-sections. For example, compressing the tube 21 as it runs through the tube forming unit 15 would produce an oval-type tube. This shape would be held by inserting and welding in an oval base plug. By way of further example, multi-faceted shapes could also be produced by applying creases to the tube 21 as it runs through the tube forming unit 15. The corresponding final shape would be held in position by the inserted base 7.

By way of further example, whilst the base loading head 45 in the embodiment of the apparatus shown in the Figures applies a partial vacuum to the base 7 that retains the base to the head 45, the invention is not so limited and extends to any suitable options for retaining the base 7 to the head 45.

What is claimed is:

1. An apparatus for manufacturing a container that includes a side wall in the form of a tube and a base at one end of the tube, the apparatus including:
   (a) a tube forming unit for progressively folding a length of a sheet of a side wall material into an elongate tube shape having a forward end for receiving a base of the container and welding together lengthwise extending sides of the sheet to form the tube; and
   (b) a base attachment unit for positioning a base of the container on the forward end of the tube, wherein the base attachment unit includes a base loading head for picking up the base from a base feed position and supporting the base and releasing the base when the base is positioned on the forward end of the tube, wherein the base attachment unit also includes a drive assembly for moving the base loading head and the base from the base feed position to the forward end of the tube and for returning the base loading head (without the base) from the forward end of the tube to the base feed position, wherein the drive assembly is adapted to move the base loading head in a linear path away from the base feed position to a base loading position, and wherein the drive assembly is also adapted to pivot the base loading head from the base loading position to position the base on the forward end of the tube at a base receiving position.

2. The apparatus defined in claim 1 includes a control system for moving the base and the tube so that that the forward end of the tube is in a required base receiving position to receive the base.

3. The apparatus defined in claim 1 includes an end welding unit for welding the base to the forward end of the tube.

4. The apparatus defined in claim 1 wherein the base and/or the forward end of the tube are formed so that the base and the tube mechanically interlock together when the base is positioned on the forward end of the tube.

5. The apparatus defined in claim 1 wherein the base attachment unit includes an assembly for holding the forward end of the tube so that the tube has a required transverse cross-section, while each base is positioned on the forward end of the tube.

6. The apparatus defined in claim 1 wherein the tube forming unit includes:
   (a) a drive assembly for transporting the side wall sheet material and the tube formed from the material through the tube forming unit to the base receiving position;
   (b) an assembly for supporting a coil of side wall sheet material so that the sheet material can be unwound from the coil and fed through the tube forming unit,
   (c) a series of lengthwise spaced-apart tube folding elements for progressively folding the sheet material into a tube having a required transverse cross-section with side edges of the sheet material in contact along the length of the tube, and
   (d) a seam welding unit for progressively welding the side edges of the sheet material together and forming an elongate seam of the tube.

7. The apparatus defined in claim 6 wherein the tube folding elements include a pair of lengthwise spaced-apart guide roller units for guiding the tube to the seam welding unit.

8. The apparatus defined in claim 7 wherein each guide roller unit includes (i) a first set of guide rollers for contacting the outer surface of the tube and locating and guiding the tube, (ii) a first support arm supporting each first guide roller for rotation about an axis in response to contact of the first guide roller with the tube as the tube moves through the guide roller unit, and (iii) an adjustment assembly for moving each first support arm radially inwardly and outwardly between an inner position and an outer position to adjust the size of the opening for the tube.

9. The apparatus defined in claim 8 wherein the first guide rollers are arranged at spaced intervals around a perimeter that is transverse to the direction of movement of the tube and define an opening within the perimeter through which the tube moves.

10. The apparatus defined in claim 8 wherein each guide roller unit includes:
(a) an inner support plate with a central opening for the tube to pass through and a plurality of first elongate channels extending radially outwardly from the central opening, with the first elongate channels receiving and guiding the first support arms and thereby the first guide rollers for radial movement between the retracted and the extended positions; and
(b) a pair of outer support plates on opposite sides of the inner support plate, with at least one outer support plate being mounted so that it can rotate relative to the inner support plate.

11. The apparatus defined in claim 10 wherein the adjustment assembly for each first guide roller includes (i) a coupling pin extending outwardly from the first support arm of the first guide roller and (ii) a plurality of spiral grooves in the rotatable outer support plate that receive the coupling pins of the first guide rollers, with each spiral groove extending between an inner end and an outer end that is located outwardly of the inner end, whereby rotation of the outer support plate relative to the inner support plate causes the coupling pins to move along the spiral grooves and thereby outwardly or inwardly and thereby moves the first support arms and the first guide rollers radially between the inner and the outer positions so that the size of the opening defined by the first guide rollers can be selected, and (c) a locking assembly for locking the inner support plate and the outer support plate together to fix the radial position of the first guide rollers and thereby fix the size of the opening.

12. The apparatus defined in claim 11 wherein each guide roller unit includes a second set of the guide rollers and support arms adjacent the first set of guide rollers and support arms, whereby the first and the second sets of the guide rollers locate and guide the tube.

13. The apparatus defined in claim 12 wherein the inner support plate includes a plurality of second elongate channels extending radially outwardly from the central opening that receive and guide the second support arms and thereby the second guide rollers for radial movement between the inner and the outer positions.

14. The apparatus defined in claim 13 wherein the other outer support plate is mounted so that it can rotate relative to the inner support plate, and the adjustment assembly for each second guide roller includes a coupling pin extending outwardly from each second support arm and a plurality of spiral grooves in the other outer support plate that receive the coupling pins, with each spiral groove extending between an inner end and an outer end that is located outwardly of the inner end, whereby rotation of the outer support plate relative to the inner support plate causes the coupling pins to move along the spiral grooves and thereby outwardly or inwardly and thereby moves the second support arms and the second guide rollers radially between the inner and the outer positions so that the size of the opening defined by the first guide rollers can be selected.

15. The apparatus defined in claim 6 wherein the tube folding elements include a seam adjustment assembly.

16. The apparatus defined in claim 15 wherein, in a situation where the seam has overlapping side edges, the seam adjustment assembly includes a pair of gripper elements, with each gripper element being formed to engage a side edge of the sheet and to push the side edges apart to form the seam with a required overlap and to keep seam in a position that is aligned with the downstream seam welding unit.

17. An apparatus for manufacturing a container that includes a side wall in the form of a tube and a base at one end of the tube, the apparatus including:
(a) a tube forming unit for progressively folding a length of a sheet of a side wall material into an elongate tube shape having a forward end for receiving a base of the container and welding together lengthwise extending sides of the sheet to form the tube, the tube forming unit including a series of lengthwise spaced-apart tube folding elements for progressively folding the sheet material into a tube having a required transverse cross-section with side edges of the sheet material in contact along the length of the tube, wherein the tube folding elements include a pair of lengthwise spaced-apart guide roller units for guiding the tube to a seam welding unit, wherein each guide roller unit includes (i) a first set of guide rollers for contacting the outer surface of the tube and locating and guiding the tube, (ii) a first support arm supporting each first guide roller for rotation about an axis in response to contact of the first guide roller with the tube as the tube moves through the guide roller unit, and (iii) an adjustment assembly for moving each first support arm radially inwardly and outwardly between an inner position and an outer position to adjust the size of the opening for the tube; and
(b) a base attachment unit for positioning a base of the container on the forward end of the tube.

18. The apparatus defined in claim 17 wherein the first guide rollers are arranged at spaced intervals around a perimeter that is transverse to the direction of movement of the tube and define an opening within the perimeter through which the tube moves.

19. The apparatus defined in claim 17 wherein each guide roller unit includes:
(a) an inner support plate with a central opening for the tube to pass through and a plurality of first elongate channels extending radially outwardly from the central opening, with the first elongate channels receiving and guiding the first support arms and thereby the first guide rollers for radial movement between the retracted and the extended positions; and
(b) a pair of outer support plates on opposite sides of the inner support plate, with at least one outer support plate being mounted so that it can rotate relative to the inner support plate.

20. The apparatus defined in claim 19 wherein the adjustment assembly for each first guide roller includes (i) a coupling pin extending outwardly from the first support arm of the first guide roller and (ii) a plurality of spiral grooves in the rotatable outer support plate that receive the coupling pins of the first guide rollers, with each spiral groove extending between an inner end and an outer end that is located outwardly of the inner end, whereby rotation of the outer support plate relative to the inner support plate causes the coupling pins to move along the spiral grooves and thereby outwardly or inwardly and thereby moves the first support arms and the first guide rollers radially between the inner and the outer positions so that the size of the opening defined by the first guide rollers can be selected, and (c) a locking assembly for locking the inner support plate and the outer support plate together to fix the radial position of the first guide rollers and thereby fix the size of the opening.

21. The apparatus defined in claim 20 wherein each guide roller unit includes a second set of the guide rollers and support arms adjacent the first set of guide rollers and support arms, whereby the first and the second sets of the guide rollers locate and guide the tube.

22. The apparatus defined in claim 21 wherein the inner support plate includes a plurality of second elongate channels extending radially outwardly from the central opening that receive and guide the second support arms and thereby the second guide rollers for radial movement between the inner and the outer positions.

23. The apparatus defined in claim 22 wherein the other outer support plate is mounted so that it can rotate relative to the inner support plate, and the adjustment assembly for each second guide roller includes a coupling pin extending outwardly from each second support arm and a plurality of spiral grooves in the other outer support plate that receive the coupling pins, with each spiral groove extending between an inner end and an outer end that is located outwardly of the inner end, whereby rotation of the outer support plate relative to the inner support plate causes the coupling pins to move along the spiral grooves and thereby outwardly or inwardly and thereby moves the second support arms and the second guide rollers radially between the inner and the outer positions so that the size of the opening defined by the first guide rollers can be selected.

24. An apparatus for manufacturing a container that includes a side wall in the form of a tube and a base at one end of the tube, the apparatus including:
  (a) a tube forming unit for progressively folding a length of a sheet of a side wall material into an elongate tube shape having a forward end for receiving a base of the container and welding together lengthwise extending sides of the sheet to form the tube, wherein the tube forming unit includes:
  (i) a drive assembly for transporting the side wall sheet material and the tube formed from the material through the tube forming unit to a base receiving position,
  (ii) an assembly for supporting a coil of side wall sheet material so that the sheet material can be unwound from the coil and fed through the tube forming unit,
  (iii) a series of lengthwise spaced-apart tube folding elements for progressively folding the sheet material into a tube having a required transverse cross-section with side edges of the sheet material in contact along the length of the tube, wherein the tube folding elements include a seam adjustment assembly, and wherein, in a situation where the seam has overlapping side edges, the seam adjustment assembly includes a pair of gripper elements, with each gripper element being formed to engage a side edge of the sheet and to push the side edges apart to form the seam with a required overlap and to keep seam in a position that is aligned with the downstream seam welding unit; and
  (iv) a seam welding unit for progressively welding the side edges of the sheet material together and forming an elongate seam of the tube; and
  (b) a base attachment unit for positioning a base of the container on the forward end of the tube.

* * * * *